United States Patent Office 3,444,105
Patented May 13, 1969

3,444,105
PRODUCTION OF FOAM PRODUCTS FROM TALL OIL ALKYDS AND A LIQUID DIENE POLYMER
Charles P. West, Metuchen, and Alan E. Weinberg, Verona, N.J., and William F. Oliver, New Cassel, and Rafael J. Perez, Flushing, N.Y., assignors to U.S. Plywood-Champion Papers Inc., a corporation of New York
No Drawing. Filed Feb. 16, 1966, Ser. No. 527,755
Int. Cl. C08g 53/08, 45/04
U.S. Cl. 260—2.5     15 Claims

ABSTRACT OF THE DISCLOSURE

The invention relates to a method of foaming a mixture of an alkyl of an insaturated fatty acid, sulfur monochloride and a liquid diene polymer and the product obtained therefrom.

---

This invention is directed to novel foam products, both flexible and rigid, which are based on a tall oil derivative or alkyd as a reactive component of the cell-forming system.

It has been a primary objective of this invention to produce foams which will contain large proportions of tall oil, in some instances as high as 60% or more, and which will have sufficiently low densities and/or high strengths to render them useful, for example, as packaging materials.

Tall oil is a by-product of the sulfate process for making pulp from pine. Although it is a variable mixture, illustratively about 90% of the crude product is acidic materials usually comprising approximately equal parts of rosin acids and fatty acids. The remainder is a complex mixture of fatty acid esters, sterols, higher alcohols, hydrocarbons and decomposition products. The most important fatty acid constituents of tall oil are singly and doubly unsaturated fatty acids such as oleic and linoleic acids. Abietic acid and its derivatives are the major rosin acids in crude tall oil.

In the pulping process the fatty acids and rosin acids present in wood dissolve in the liquor as sodium soaps. These soaps or crude tall oil skimmings rise to the surface of the black liquor as the total solids content is increased and as the liquor starts to cool. Addition of a mineral acid such as sulfuric acid forms the mixture of rosin and fatty acids which constitutes the crude tall oil of commerce.

There are also available various refined or purified grades of tall oil. Some of these consist largely of the fatty acid components of crude tall oil in which the rosin acid content has been reduced or almost completely removed, and such high fatty acid purified forms of tall oil are also contemplated for use herein.

In the production of foams according to the present invention, the tall oil starting material is first converted to a higher molecular weight alkyd intermediate, by reaction with a polyhydric alcohol and a carboxylic acid having at least two acidic groups in the molecule.

Broadly put, the foam is produced from a tall oil alkyd by reacting the alkyd with a diene polymer, as hereinafter identified, and sulfur monochloride. The precise nature of the interaction between these components in the practice of this invention is not presently known, but we believe that the sulfur monochloride forms an —S— or —S—S— bond which cross-links polymer chains formed from the diene polymer and/or the alkyd. The sulfur monochloride also produces gaseous reaction products which contribute to the "flow" or generation of the foam. The reaction is preferably but not necessarily carried out in the presence of a volatilizing, non-reactive organic solvent.

The diene polymers chemically incorporated in the foam with the alkyd and sulfur monochloride are synthetic, low molecular weight polymers of butadiene, and include homopolymers and copolymers of butadiene and alkyl, aryl and substituted derivatives thereof. We prefer to use unsaturated liquid diene polymers having molecular weights in the range of roughly about 500 to 10,000. Polymers we have found to be particularly useful for this purpose include butadiene homopolymers and copolymers with styrene, butadiene-acrylic acid copolymers, butadiene-methacrylic acid copolymers, and butadiene-acrylonitrile copolymers, and mixtures thereof.

Sulfur monochloride, incorporated into the foam with the alkyd and the diene polymer, is conventionally represented by the formula $S_2Cl_2$, and is a highly reactive fuming liquid having a specific gravity of 1.69 at room temperature.

This invention is predicated in part upon the discovery of a reaction system wherein the intense reactivity of $S_2Cl_2$ can be controlled to permit useful foam products to be obtained.

The present foams are preferably produced from a mixture in the liquid state which comprises, for each 100 parts of tall oil alkyd, 5–110 parts diene polymer and 10–150 parts of sulfur monochloride. It is especially advantageous to react a mixture of approximately equal parts of diene polymer and tall oil alkyd together with 40–90 parts $S_2Cl_2$ based on 100 parts of the mixture, i.e., 100 parts total of the diene and alkyd. Both flexible and rigid foams can be produced, depending upon the proportions of ingredients and the reaction conditions.

Examples of commercially available liquid diene polymers which we have found to be suitable for interaction with tall oil alkyd and sulfur monochloride to produce foams include:

"Buton 100," a liquid copolymer of butadiene and styrene in 3–4:1 weight ratio comprising about 65% 1, 2 adduct and 35% 1, 4 adduct, having a molecular weight of about 2,000–2,600, an iodine number of about 275 to 330, and viscosity of 3,500 poises, produced by Enjay Corporation;

"Buton 150," a liquid butadiene homopolymer having a molecular weight of about 2,500–3,500, an iodine number of about 410, comprising 65% 1, 2 adduct and 35% 1, 4 adduct, produced by Enjay Corporation;

"Butarez CTL," Type II, an acid-terminated liquid copolymer of butadiene and acrylic acid having a carboxy content of 1.66%, and a molecular weight of 5500, produced by Phillips Petroleum;

"BD," a liquid homopolymer of butadiene, produced by Sinclair Refining.

We have also found it possible to produce foams from tall oil alkyd and sulfur monochloride alone, without the inclusion of a diene polymer. However, such foams are in general relatively heavy compared with foams containing the diene polymer and are poorer in compressive strength.

As suggested, the reaction of the foam components is advantageously carried out in the presence of an organic solvent for the diene polymer, such as a Freon, pentane or naphtha. While the boiling range of the solvent is not critical, a solvent having a boiling point in the range of about 20 to 40° C. is especially useful.

In the preliminary alkydization of crude or refined tall oil, the oil is first esterified with a polyol such as glycerine and is then reacted with an organic acid or acid anhydride such as maleic anhydride. In this reaction heat is applied and a catalyst may be used to cause a higher molecular weight product to be formed as water is split off.

Among the polyols which are suitable for the production of tall oil alkyds there may be specifically mentioned ethylene glycol, propylene glycol, glycerine, trimethylol ethane, trimethylol propane, pentaerythritol, di- and tri-pentaerthritol, and hydrogenated bisphenol A.

Among the suitable acids and acid anhydrides are phthalic anhydride, isophthalic acid, maleic anhydride, fumaric acid, and adipic acid, all of which are characterized by an ability to enter into dicarboxylic reactions. The specific acids and alcohols as listed are of course only representative, and the production of tall oil alkyds suitable for use as starting materials in the production of foams is not limited to the use of these materials.

In the production of the alkyd the proportions of tall oil, polyol, and polycarboxylic acid may vary rather widely. The alkyds on which the foams of this invention are based are preferably produced by the reaction, with each 100 parts tall oil or tall oil fatty acids, of 3–30 parts of a polyol and 3–25 parts of a dicarboxylic acid or acid anhydride. We have found that the polyol to be used should preferably have three or more hydroxyl groups in the molecule although diols may be used in mixture therewith, as will be seen.

In addition to these components, a catalyst such as lithium hydroxide may be used, preferably in the proportions of about 0–1 part to each 100 parts by weight of tall oil. The mixture may also include an additional 25 to 125 parts of a diene polymer which may be the same type of diene polymer as is subsequently to be incorporated in the reaction of the alkyd to produce the foam.

For purposes of illustration of the types of alkyds which can be used, the production of several suitable alkyds from tall oil, a polyol, and a polycarboxylic acid or anhydride is illustrated in Table I. All alkyd formulae set forth hereinafter are based upon 100 parts of the tall oil, either of the crude or refined type, and all quantities are parts by weight per 100 parts tall oil unless otherwise noted.

an acid number of about 5 to 50 is obtained and viscosity is in the range of Z4 to Z8 as measured by the Gardner method.

Example G of the Table I illustrates the production of an alkyd using tall oil fatty acids, in the absence of the rosin component of tall oil. It will be appreciated that other sources of unsaturated fatty acids having 11 to 22 carbon atoms in the molecule can be used in the alkyd production.

The production of an alkyd which includes a diene polymer as a constituent thereof, in addition to the polyol and carboxylic acids, is shown in Examples I and J of Table I.

It is contemplated that the molecular weight of the alkyd can be increased prior to foaming by bodying it with a small proportion of $S_2Cl_2$ insufficient in amount to cause foaming, for example 1 to 10 parts per hundred parts alkyd.

In the production of the foam from the alkyd we prefer that all of the ingredients except the sulfur monochloride be premixed and that the sulfur monochloride be added last. Upon blending the sulfur monochloride into the mixture, foam quickly starts to rise, often in a minute or less.

The foam will set or cure without the application of external heat. Optimum sulfur monochloride content for given alkyds and diene contents can be determined by making a series of tests with compositions having different $S_2Cl_2$ contents, the proportions of other ingredients remaining the same.

The production of a foam from an alkyd of the type described can best be seen from Example 1 following, which presently constitutes our preferred formulation for a flexible foam:

TABLE I.—PRODUCTION OF ALKYD

| Example | A | B | C |
|---|---|---|---|
| Tall oil: Type, gms | Crude, 100.0 | Crude, 100.0 | Refined, 100.0 |
| Polyol: Type, gms | Glycerine, 15.1 | Glycerine, 15.1 | Glycerine, 15.6 |
| Acid: Type, gms | Maleic anhydride, 7.4 | Maleic anhydride, 7.4 | Maleic anhydride, 7.6 |
| Catalyst: Type, gms | LiOH. $H_2O$, 0.1 | | |
| Reaction conditions | Tall oil, polyol, catalyst heated 4 hrs. at 235° C. peak temp.; acid added and heated 8 hrs. at 260° C. peak temp. | Tall oil, polyol heated 4 hrs. at 260° C. peak temp.; acid added, heated 9 hrs. at 260° C. peak temp. | Tall oil, polyol heated 2.5 hrs. at 265° C. peak temp.; acid added, heated 5.5 hrs. at 275° C. peak temp. |

| Example | D | E | F |
|---|---|---|---|
| Tall oil: Type, gms | Crude, 100.0 | Crude, 100.0 | Crude, 100.0 |
| Polyol: Type, gms | Trimethylol propane, 28.5 | Trimethylol propane, 28.5 | Glycerine, 18.0 |
| Acid: Type, gms | Adipic, 21.5; maleic anhydride, 7.4 | Adipic acid, 21.5 | Phthalic anhydride, 15.9 |
| Catalyst: Type, gms | | | |
| Reaction conditions | Tall oil, polyol, adipic acid heated 5 hrs. at 266° C. peak temp.; maleic anhydride added, heated 1 hr. at 280° C. peak temp. | Tall oil, polyol and acid heated 7.8 hrs. at 280° C. peak temp. | Tall oil and polyol heated 1.5 hrs. at 270° C. Phthalic added and heated over 9.1 hrs. at 250° C. peak temp. |

| Example | G | H |
|---|---|---|
| Tall oil: Type, gms | Mixed fatty acids, 100.0 | Crude, 100.0 |
| Polyol: Type, gms | Glycerine, 18.4 | Ethylene glycol, 7.6; pentaerythritol, 8.8 |
| Acid: Type, gms | Maleic anhydride, 4.5; phthalic anhydride, 6.6 | Maleic anhydride, 7.4 |
| Tall oil wt./polyol wt | | |
| Polyol wt./acid wt | | |
| Reaction conditions | Fatty acids, polyol heated 3 hrs. at 250° C. peak temp., acids added, heated 11 hrs. at 240° C. peak temp. | Tall oil, polyols heated 7.5 hrs. at 210° C. peak temp.; acid added, heated 10 hrs. at 269° C. peak temp. |

| Example | I | J |
|---|---|---|
| Tall oil: Type, gms | Crude, 100.0 | Refined, 100.0 |
| Diene polymer: Type, gms | Buton 150, 100.0 | Buton 100, 50.0 |
| Polyol: Type, gms | Pentaerythritol, 5.0 | Pentaerythritol, 5.0 |
| Acid: Type, gms | Maleic anhydride, 5.0 | Maleic anhydride, 5.0 |
| Reaction conditions | Tall oil, polymer heated .5 hr. to 260° C.; acid added, heated .08 hr. at 250° C.; polyol added, heated .12 hr. at 250° C. | Tall oil, polymer heated 1 hr. to 260° C.; acid added, heated .08 hr. at 270° C.; polyol added, heated .12 hr. at 250° C. |

As shown in the table, the tall oil and polyol can advantageously first be mixed and heated to a temperature in the range of about 210–280° C. over a period of about 0.5 to 10 hours. The acid or acid anhydride can then be added and the mixture again heated, to a temperature in the range of about 220 to 290° C. for 1 to 15 hours. These conditions and temperatures are to be considered illustrative only and should not be taken as limiting the types of alkyds which can be used.

We prefer to continue the heating of the alkyd until

Example 1

| | Parts by weight |
|---|---|
| Alkyd produced according to Example A of Table I | 100.0 |
| "Buton 100" | 100.0 |
| Freon-11 | 20 |
| Pentane | 53.4 |
| Dow-Corning "232" Surfactant | 1.3 |
| $S_2Cl_2$ | 56.6 |

All the components except the $S_2Cl_2$ were first mixed for about a minute in a counter-rotating mixer. Mixing the other components prior to the addition of $S_2Cl_2$ enables better homogeneity to be achieved, because foaming begins quickly upon addition of the $S_2Cl_2$. After mixing in the $S_2Cl_2$ the mixture is permitted to set up in a mold of desired shape.

Foam generation or blowing with this formulation begins quite rapidly, typically within a few seconds after addition of the $S_2Cl_2$, and the reaction mass rises in the mold as foaming occurs. Mixing may be terminated once visible foaming begins in order to minimize density.

Other examples of the production of foams from alkyds of this type are shown in Examples 2 through 12 of Table II. All formulae set forth in the table are based upon 100 parts of the alkyd, and all quantities are parts by weight per 100 parts alkyd unless otherwise noted.

useful proportions of the surfacant are about 0.5 to 5 parts per 100 parts alkyd.

A pulverized alkali metal carbonate or bicarbonate may be added as a secondary blowing agent, and provides additional control of foam density. The most useful proportions are 0.5 to 5 parts per 100 parts alkyd. These materials decompose to evolve $CO_2$ during the reaction, and it is believed that the alkali reacts with HCl evolved from the reaction of the $S_2Cl_2$ to form the corresponding chloride salt. Since this reduces the acidity of the foam, it is especially useful if the proportion of carbonate or bicarbonate is in substantial stoichiometric balance with the quantity of HCl produced by the $S_2Cl_2$ which is to be incorporated in a given formulation.

The proportions of $S_2Cl_2$ to achieve the desired degree of foaming and product rigidity or flexibility can readily be determined for a specific polymer and/or alkyd from

TABLE II.—PRODUCTION OF FOAM

| Example Number | 2 | 3 | 4 | 5 | 6 | 7 |
|---|---|---|---|---|---|---|
| Alkyd, gms | 100.0 | 100.0 | 100.0 | 100.0 | 100.0 | 100.0 |
| Diene polymer: Type, gms | Buton 100, 100.0 | Buton 100, 100.0 | Buton 100, 100.0 | Buton 150, 100.0 | Sinclair BD, 100.0 | Butarez CTL,II, 100.0 |
| $S_2Cl_2$, gms | 45.3 | 84.7 | 146.0 | 84.7 | 84.7 | 84.7 |
| Freon-11, gms | 20.0 | 20.0 | 20.0 | 20.0 | 20.0 | 20.0 |
| Solvent: Type, gms | Pentane, 33.3 | Pentane, 33.3 | Pentane, 33.3 | Pentane, 33.3 | Pentane, 33.3 | Pentane, 33.3 |
| $Na_2SiO_3$, gms | 1.3 | | 1.3 | 1.3 | 1.3 | 1.3 |
| $NaHCO_3$, gms | | 3.3 | | | | |
| Surfactant: Type, gms | DC-232, 1.3 | DC-199, 1.3 | DC-232, 1.3 | DC-232, 4.0 | DC-232, 1.3 | DC-232, 4.0 |

| Example Number | 8 | 9 | 10 | 11 | 12 |
|---|---|---|---|---|---|
| Alkyd, gms | 100.0 | 100.0 | 100.0 | 100.0 | 100.0 |
| Diene polymer: Type, gms | Buton 100, 32.4 | Buton 100, 13.3 | Buton 100, 13.3 | Buton 100, 6.7 | Buton 100, 6.7 |
| $S_2Cl_2$, gms | 55.9 | 28.4 | 42.3 | 17.0 | 67.7 |
| Freon-11, gms | 13.3 | 10.0 | 10.0 | 10.0 | 10.0 |
| Solvent: Type, gms | Pentane, 22.2 | Pentane, 16.7 | Pentane, 16.7 | Pentane, 16.7 | Pentane, 16.7 |
| $Na_2SiO_3$, gms | | 0.7 | 0.7 | 0.7 | 0.7 |
| $NaHCO_3$, gms | 2.2 | | | | |
| Surfactant: Type, gms | DC-199, .9 | DC-232, 2.0 | DC-232, 2.0 | DC-232, 0.7 | DC-232, 0.7 |

The use of a volatilizing solvent such as pentane reduces the viscosity of the diene polymer and permits it to be mixed more readily with the alkyd to achieve more uniform reaction. While the reaction can be conducted in the absence of a solvent, as will be seen hereinafter, their use is preferred.

One or more other propellants or solvents for the diene polymer such as "Freon-11" ($CCl_3F$, boiling point about 24° C.) or naphtha may be used in place of some or all of the pentane (boiling point about 36° C.). Solvents of higher boiling point such as VM & P naphtha (boiling point 93–149° C.) have a generally opposite effect, providing longer working periods before the start of the rise, but total rise is reduced. In general, any solvent for the diene polymer or $S_2Cl_2$ may be used which is not disadvantageously reactive with the components, but we prefer aromatic or aliphatic solvents which are completely inert toward $S_2Cl_2$. The generally useful total proportions of solvents such as pentane and Freon-11 are about 10 to 60 parts per 100 parts alkyd, though it will be appreciated that certain polymers will be more soluble in given solvents than others and that the proportions can be varied accordingly.

The sodium silicate employed may for example be a 47° Baumé aqueous solution, containing about 11% $Na_2O$ and 31.9% $SiO_2$ by weight. We have found it to be surprisingly effective in contributing to a finer and more uniform cell formation. While the use of $Na_2SiO_3$ is not necessary in the sense that a foam cannot be produced in its absence, we consider it to be desirable. The most useful range of addition of the 47° sodium silicate solution is about 0.5 to 2.0 parts per 100 parts alkyd.

The surfactant "DC 232" is a dimethyl polysiloxane produced by Dow Corning Corporation. It has the effect of making the cells of the foam finer and causes a higher foam rise, i.e., it reduces the foam density. The use of this or another comparable surfactant is therefore desirable, although not absolutely necessary. Other representative surfacants which are suitable for use include those listed in our copending application Ser. No. 455,596, filed May 13, 1965 to which reference is hereby made. The most a series of test compositions in which the other ingredients are held constant while the proportions of $S_2Cl_2$ are changed.

In each of the examples of Table II the sulfur monochloride was the last ingredient to be added. In those formulations containing Freon-11 we found it advantageous to blend in the Freon immediately prior to adding the sulfur monochloride in order to minimize volatilization. Generally speaking, generation of the foam should proceed roughly apace of the curing reaction so that the foam will be relatively stable as it is generated and will be set before it might collapse. Where a large volume of foam is to be produced in a single batch, it may be desirable to apply cooling means to prevent reaction temperature from becoming excessive. The product will self-harden without further treatment, usually after two or three hours. The mixture may be applied to a mold or container from a foaming gun wherein an $S_2Cl_2$ stream is contacted in a mixing head at a controlled rate with a stream containing the other ingredients and the mixed streams are fed continuously into a mold or onto a moving belt.

The density of a given foam composition will depend upon conditions of mixing, foam volume, the manner in which the monochloride is added, the absence or presence and quantity of rosin, the quantity of blowing agents or volatilizing solvents, and other factors. Diene polymers of lower unsaturation than the butadiene homopolymers, such as butadiene-styrene copolymers having a butadiene/styrene weight ratio of less than 1.0 are believed to give more easily controllable foams and foams with lower densities.

In general, the proportion of sulfur monochloride to be incorporated should increase as the alkyd/diene polymer ratio increases to give the same degree of rigidity.

As previously suggested, we have also found it possible to produce foams by the direct reaction of a tall oil alkyd with sulfur monochloride alone, that is, without the incorporation of a diene polymer. The production of several such foams from alkyd of the type previously described is shown in Table III. Production of these foams proceeds in the manner described previously, except that no diene is added.

TABLE III

| Example Number | 13 | 14 | 15 | 16 | 17 |
|---|---|---|---|---|---|
| Alkyd: Ex. No., gms | F, 100.0 | G, 100.0 | H, 100.0 | A, 100.0 | A, 100.0 |
| $S_2Cl_2$, gms | 22.8 | 22.8 | 24.8 | 24.8 | 37.2 |
| Freon-11, gms | | | | 8.8 | 8.8 |
| Solvent: Type, gms | | Pentane, 13.3 | Pentane, 14.7 | Pentane, 14.7 | Pentane, 14.7 |
| $Na_2SiO_3$, gms | | | | 0.6 | 0.6 |
| Surfactant: Type, gms | | | | DC-232, 1.8 | DC-232, 1.8 |

In the foregoing examples the crude tall oil used had a fatty acid content of about 40 to 55%, a rosin acid content of 36–46%, and 8–10% unsaponifiables. Its acid number was about 160–170, its saponification number was 165–175, and its iodine value was 140–150.

The alkyd and/or diene polymer or a mixture thereof can be bodied to partially increase its molecular weight in advance of the foam producing reaction, by pre-reaction with a proportion of sulfur monochloride which is insufficient to cause foaming or gellation. To carry out the prebodying reaction effectively it is important that the proportion of $S_2Cl_2$ which is added be such as to cause the liquid to thicken without frothing, charring or gellation, which would render further reaction ineffective or inoperative or which would harm foam quality.

The foam products produced in accordance with this invention are adapted to be used for packaging, insulation purposes, and as core materials in "sandwich" or laminated products.

While we have described the preferred embodiment of our invention, those skilled in the art will recognize that the invention is susceptible to various modifications and variations within the scope of the following claims.

What is claimed is:

1. The method of producing a foam which comprises mixing together and spontaneously interreacting an alkyd of an unsaturated fatty acid having 11 to 22 carbon atoms, sulfur monochloride, and a liquid diene polymer selected from the class consisting of butadiene homopolymers, butadiene-styrene copolymers, butadiene-acrylic acid copolymers, butadiene-methacrylic acid copolymers and butadiene acrylonitrile copolymers, and mixtures thereof, the proportions in the mixture being such that diene polymer is present in the amount of about 5 to 110 parts to each 100 parts of the alkyd and further such that the $S_2Cl_2$ is present in the range of about 10 to 150 parts to each 100 parts of the alkyd, and permitting the foam to expand and self-cure.

2. The method of claim 1 wherein said alkyd is produced by the reaction of tall oil with a polyol and a dicarboxylic acid.

3. The method of claim 2 wherein said polyol has three reactive hydroxyl groups per molecule.

4. The method of claim 3 wherein said alkyd is produced by the reaction of tall oil with glycerin and maleic anhydride in approximate 100/15/7 weight ratio.

5. The method of claim 1 wherein said diene polymer is present in about equal proportion to said alkyd.

6. The method of claim 5 wherein said sulfur monochloride is present in the amount of about 40–90 parts per 100 parts total of said diene and said alkyd.

7. The product of the process of claim 1.

8. The method of producing a foam which comprises preparing a mixture having as the polymerizing components thereof about 100 parts of an alkyd of an unsaturated fatty acid having 11 to 22 carbon atoms, and about 100 parts of an unsaturated liquid polymer of butadiene having a molecular weight in the range of 500–10,000, in the presence of a solvent for said polymer having a boiling point in the range of 20–40° C., mixing therewith a proportion of $S_2Cl_2$ sufficient to cause foaming, and permitting the resulting foam to expand and self-cure.

9. The method of claim 8 wherein said mixture also contains $Na_2SiO_3$ as a cell control agent.

10. The method of claim 8 wherein said mixture also contains a $CO_2$-generating salt of an alkali metal.

11. The method of claim 8 wherein said alkyd has been previously reacted with $S_2Cl_2$ in amount sufficient to thicken said alkyd and increase its molecular weight but not to cause frothing thereof.

12. The method of producing a foam which comprises mixing together and spontaneously interreacting an alkyd of an unsaturated fatty acid having 11 to 22 carbon atoms with sulfur monochloride in proportions of 100 parts alkyd to 10–50 parts of said monochloride, and permitting the foam to expand and self-cure.

13. The method of claim 12 wherein said alkyd is the product of the reaction of tall oil with a polyol and a dicarboxylic acid.

14. The method of producing a foam which comprises, reacting tall oil to form an alkyd thereof with at least one polyol selected from the class consisting of glycerine, pentaerythritol, propylene glycol, and tri-methylol propane, and with an acidic material selected from the class consisting of maleic anhydride, phthalic anhydride, and adipic acid, in proportions equal to about 100 weight parts tall oil to 3–30 parts polyol and 3–25 parts acidic material, preparing a mixture having as polymerizable components thereof about 100 parts of said alkyd and about 5–110 parts of an unsaturated liquid polymer of butadiene having a molecular weight in the range of about 500–10,000, said mixture also containing a volatilizable solvent for said polymer, mixing therewith a proportion of $S_2Cl_2$ sufficient to cause said mixture to foam, and permitting the resulting foam to expand and self-cure.

15. The method of claim 14 wherein said alkyd also contains a butadiene polymer chemically combined therein with said polyol and acid.

References Cited

UNITED STATES PATENTS

| 2,208,305 | 7/1940 | Kittredge. | |
| 2,234,545 | 3/1941 | Auer | 260—777 |
| 2,662,862 | 12/1953 | Crouch. | |
| 2,888,417 | 5/1959 | Crouch. | |
| 3,260,688 | 7/1966 | Watanabe et al. | |

GEORGE F. LESMES, *Primary Examiner.*

MORTON FOELAK, *Assistant Examiner.*

U.S. Cl. X.R.

260—22, 40, 41.5, 777